Aug. 6, 1940.   S. L. KELLY   2,210,623
SERVICE PORTION GATHERER
Filed April 28, 1939   2 Sheets-Sheet 1
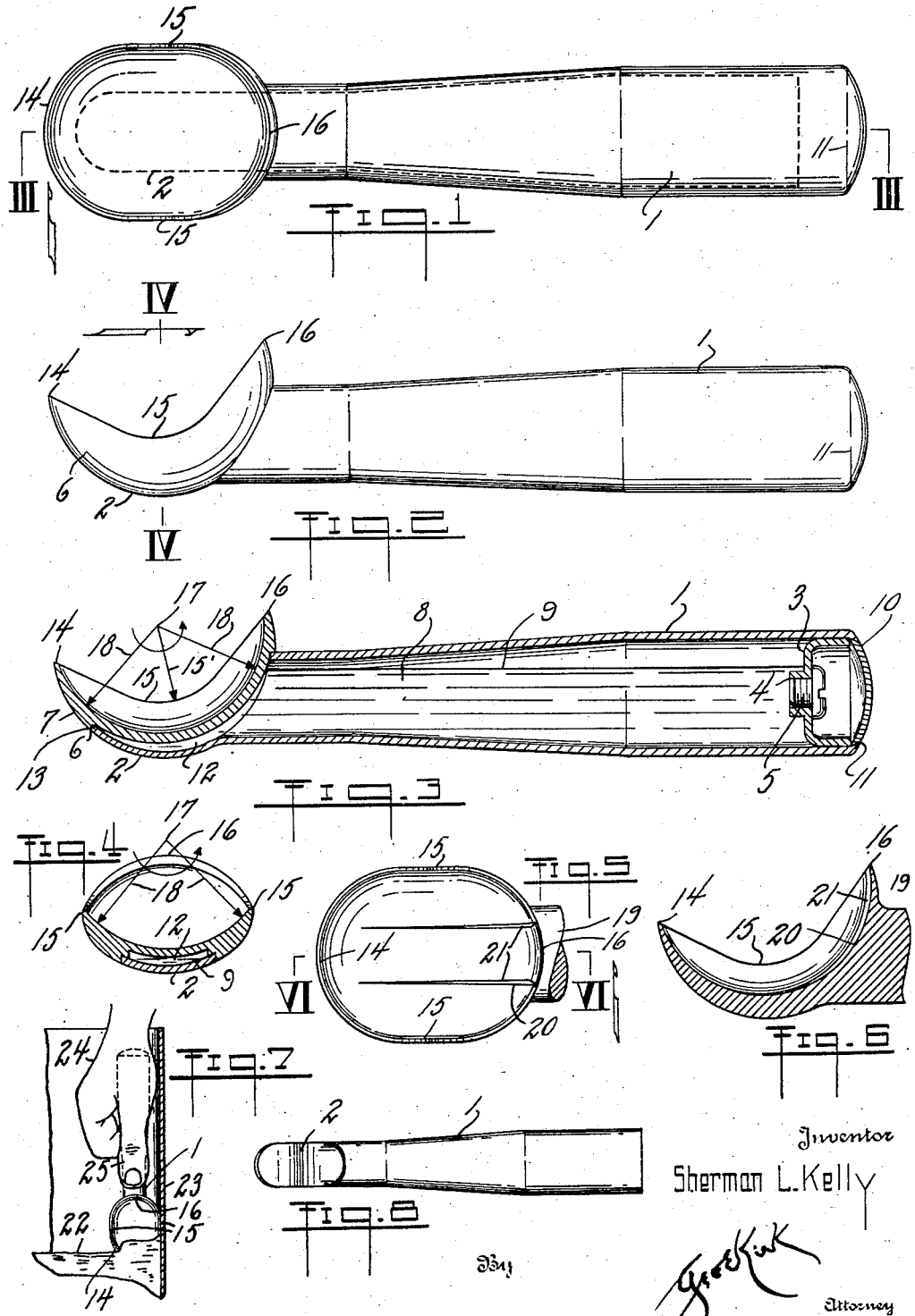
Inventor
Sherman L. Kelly Aug. 6, 1940.  S. L. KELLY  2,210,623
SERVICE PORTION GATHERER
Filed April 28, 1939  2 Sheets-Sheet 2
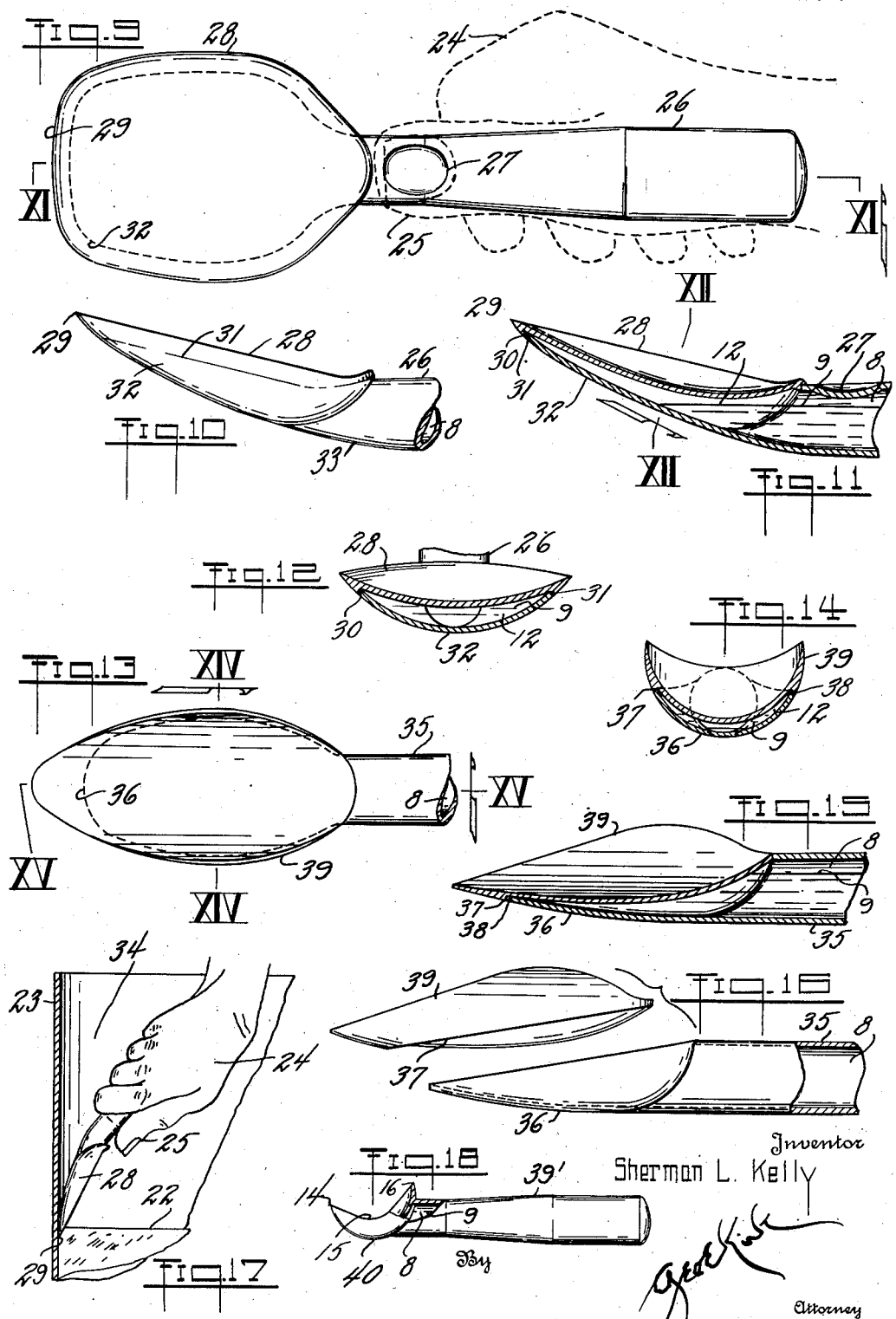

Patented Aug. 6, 1940

2,210,623

UNITED STATES PATENT OFFICE 2,210,623

SERVICE PORTION GATHERER

Sherman L. Kelly, Toledo, Ohio, assignor to Kelly-Wheaton Company, Toledo, Ohio, a corporation of Ohio Application April 28, 1939, Serial No. 270,490

7 Claims. (Cl. 107—48)

This invention relates to gathering of service portions of congealed material, such as ice cream.

This invention has utility when incorporated in hand operable devices for separating and removing portions from bulk material.

Referring to the drawings:

Fig. 1 is a plan view of an embodiment of the ice cream scoop or dipper;

Fig. 2 is a side elevation of the scoop or dipper of Fig. 1;

Fig. 3 is a section on the line III—III, Fig. 1, showing the scoop with a partial charge of liquid in the tubular handle;

Fig. 4 is a section on the line IV—IV, Fig. 2, showing the handle chamber extending under the spherical bowl of the scoop;

Fig. 5 is a detail view in plan showing a bowl having a groove extending to a point short of the severing rim;

Fig. 6 is a section on the line VI—VI, Fig. 5, showing the progressive depth of the groove;

Fig. 7 is a fragmentary view in detail showing how the handle of the scoop is gripped close to the bowl;

Fig. 8 is a detail view in plan of the tubular blank for the handle having a tongue integral therewith to form a closure for the chamber in the back of the scoop bowl;

Fig. 9 is a plan view of the tool wherein the handle has a thumb seat adjacent the scoop and which scoop is more of the spread or spade type;

Fig. 10 is a side elevation of the scoop of Fig. 9;

Fig. 11 is a section on the line XI—XI, Fig. 9, showing the scoop with the chamber extending from the handle along the back of the bowl;

Fig. 12 is a section on the line XII—XII, Fig. 11.

Fig. 13 is a plan view, parts being broken away, of another shape of a bowl;

Fig. 14 is a section on the line XIV—XIV, Fig. 13;

Fig. 15 is a section on the line XV—XV, Fig. 13, showing the chamber extending from the handle under the bowl;

Fig. 16 is a distributed view, showing the bowl in slightly spaced position from the tongue of the handle, which when assembled completes a chamber from the handle;

Fig. 17 is a fragmentary view showing how the scoop of Fig. 9, for example, is grasped adjacent the bowl by the user; and Fig. 18 is a view, with parts broken away, of an embodiment of the tool having the scoop and handle as a unit.

A tubular blank 1 has a tongue 2. Remote from this tongue 2, a partition 3 (Fig. 3) has a central opening 4 into which may be placed a removable plug 5. A weld or a seal 6 between the tongue 2 and the scoop 7 completes a chamber 8, into which may be introduced a liquid refrigerant 9. The liquid, in slushing against the back of the bowl, tends to keep the congealed matter so it may not have sticking adherence thereto.

The partition 3 is slightly countersunk in the handle or the grip 1. As the plug 5 is in place, a disk 10 may be snapped into sealing relation with the end of the handle and have the rim 11 spun thereabout. The chamber 8 has a chamber extension 12 which is continuous therewith. In the back of the scoop bowl there is an offset ledge 13 so that the tongue 2 may be flush at the joint 6. This scoop has remote from the grip 1 a severing rim 14, from which rim 14 there extends a pair of concave edges 15. These edges 15 extend to a convex rear or remote edge 16. From a center 17 the bowl has a constant radius 18 thereby providing a spherical bowl extending from this endless bounding edge or rim portion. A non-tubular handle 19 (Fig. 5) extends from the bowl, which bowl has a depressed portion 20 spaced from the severing rim 14 and progressively increasing in its depth toward the convex rear edge 16. Beveled sides 21, of the depressed portion, form a pair of parallel ribs. Centrally the edges 15 are on a radius 15' (Fig. 3).

A congealed material 22 may be severed from close to the sides of a container 23. In operating, the user places his hand 24 in such a position that his thumb 25 is adjacent the scoop or bowl after edge 16. A tubular handle or blank 26 (Fig. 9) has a seat 27 which is provided for the thumb 25 of the user. A scoop 28 has a severing rim 29. A ledge 30 is united by a seal 31 (Fig. 11) with a tongue 32. An angle 33 provides a working clearance 34 (Fig. 17).

A grip 35 (Fig. 15) has a tongue 36 to a ledge 37, which a seat 38 unites such with a scoop 39. A handle 39' which has a bowl 40 (Fig. 18) may be produced from a sheet metal or tubular blank.

This application is a continuation-in-part of the copending application of Patent No. 2,160,023, May 30, 1939, having, as to its disclosure, original filing date of August 21, 1934.

What is claimed and it is desired to secure by United States Letters Patent is:

1. A service portion gatherer having a severing rim, a concave portion extending therefrom, and a tubular handle grip portion integral therewith having a tongue extending along the back of said concave portion, said tongue being sealed to the back of the concave portion to provide a closed chamber extending from the hand or grip portion directly into the back of said concave portion.

2. A service portion gatherer scoop having a convex severing rim, said scoop having a spherical bowl concave from the severing rim between concave edges also extending from the severing rim.

3. A service portion gatherer having a severing rim, a concave portion extending therefrom, a tubular handle merging into the back of the concave portion and therewith forming a chamber, a closure partition for the handle remote from the concave portion, a removable plug in said closure for closing said chamber, and a sealing disk for hiding said plug.

4. A service portion gatherer having a severing rim, a concave portion extending therefrom, a tubular handle having integral therewith a tongue complemental as to a portion of the back of the concave portion and marginally sealed with the back of the concave portion as a closure to form a chamber extending directly from the grip portion of the handle.

5. A service portion gatherer having a severing rim, a concave portion extending therefrom between a pair of edges, a tubular handle having integral therewith a tongue complemental as to a portion of the back of the concave portion and marginally sealed with the back of the concave portion and spaced from the rim and said edges with said handle and back of said concave portion forming a closed chamber extending from the grip portion of the handle.

6. A service portion gatherer scoop having a concave bowl provided with a convex severing rim at one side of the bowl, and a handle extending away from the opposite side of the bowl, there being a groove extending into the bowl and spaced from the severing rim.

7. A service portion gatherer unit having a severing rim, a concave portion extending therefrom to provide a bowl, and a tubular handle having a sheet metal extension with its marginal region engaging the bowl and therewith forming a chamber which extends directly about a portion of the bowl and then laterally from the back of the concave portion into the handle.

SHERMAN L. KELLY.